US007005756B2

(12) United States Patent
Westerbeke, Jr.

(10) Patent No.: US 7,005,756 B2
(45) Date of Patent: Feb. 28, 2006

(54) MARINE POWER GENERATION AND ENGINE COOLING

(75) Inventor: John H. Westerbeke, Jr., Milton, MA (US)

(73) Assignee: Westerheke Corporation, Taunton, MA (US)

(*) Notice: Subject to any disclaimer, the term of this patent is extended or adjusted under 35 U.S.C. 154(b) by 0 days.

(21) Appl. No.: 10/057,504

(22) Filed: Jan. 25, 2002

(65) Prior Publication Data

US 2002/0121780 A1 Sep. 5, 2002

Related U.S. Application Data

(63) Continuation-in-part of application No. PCT/US01/49981, filed on Nov. 7, 2001.

(60) Provisional application No. 60/266,841, filed on Feb. 6, 2001, provisional application No. 60/246,554, filed on Nov. 7, 2000.

(51) Int. Cl.
*H02P 9/04* (2006.01)

(52) U.S. Cl. ....................................................... 290/1 A

(58) Field of Classification Search ................ 290/1 A, 290/1 B, 2, 1 R, 43, 54; 114/56, 270; 440/113, 440/89
See application file for complete search history.

(56) References Cited

U.S. PATENT DOCUMENTS

| | | | | | |
|---|---|---|---|---|---|
| 1,898,973 | A | * | 2/1933 | Lansing | 440/6 |
| 2,879,738 | A | | 3/1959 | Culbertson | |
| 3,619,632 | A | * | 11/1971 | Labombarde | 290/43 |
| 3,703,642 | A | | 11/1972 | Balaguer | |
| 3,750,607 | A | * | 8/1973 | Seymour et al. | 114/65 R |
| 4,007,387 | A | * | 2/1977 | Rustecki | 310/42 |
| 4,010,377 | A | | 3/1977 | McKenzie | |
| 4,540,888 | A | | 9/1985 | Drewry et al. | |
| 4,548,164 | A | | 10/1985 | Ylönen et al. | |
| 4,695,261 | A | | 9/1987 | Broughton et al. | |
| 4,779,905 | A | | 10/1988 | Ito et al. | |
| 4,836,123 | A | * | 6/1989 | Grinde et al. | 114/382 |
| 4,859,886 | A | | 8/1989 | Tanaka et al. | |
| 4,873,962 | A | | 10/1989 | Safranek | |
| 4,972,809 | A | * | 11/1990 | Hirasawa | 123/55.7 |
| 5,011,442 | A | | 4/1991 | Polcz et al. | |
| 5,041,034 | A | | 8/1991 | Sakamoto | |
| 5,129,343 | A | * | 7/1992 | Giles | 114/271 |
| 5,370,563 | A | | 12/1994 | Yamazaki et al. | |
| 5,376,028 | A | * | 12/1994 | Koyanagi | 440/41 |
| 5,626,105 | A | | 5/1997 | Locke et al. | |
| 5,904,604 | A | | 5/1999 | Suzuki et al. | |
| 5,965,999 | A | | 10/1999 | Frank | |
| 5,989,084 | A | | 11/1999 | Tsunoda et al. | |

(Continued)

FOREIGN PATENT DOCUMENTS

WO WO0245189 * 6/2002

*Primary Examiner*—Darren Schuberg
*Assistant Examiner*—Heba Elkassabgi
(74) *Attorney, Agent, or Firm*—Fish & Richardson P.C.

(57) ABSTRACT

An on-board marine electrical power generator (14) containing a conventional four-stroke, water-cooled outboard motor engine (50) coupled to an alternator (52) upon a transportable frame (44) suitable for mounting on-board a boat. In one embodiment, the crankshaft (60) of the engine extends vertically and is coupled to a vertically oriented rotor (72) of the alternator, either directly or laterally spaced from the engine shaft. In another embodiment, the engine is modified for operation with its crankshaft extending horizontally. The physical size of the overall package is advantageously within a range suitable for installation on pleasure boats, even below deck.

18 Claims, 5 Drawing Sheets

U.S. PATENT DOCUMENTS

| | | | | |
|---|---|---|---|---|
| 6,008,614 | A | 12/1999 | Imai | |
| 6,084,313 | A | 7/2000 | Frank | |
| 6,149,478 | A | 11/2000 | Lehmann | |
| 6,240,885 | B1 * | 6/2001 | Hanson | 123/55.5 |
| 6,414,399 | B1 * | 7/2002 | Bianchi | 290/1 A |
| 6,435,925 | B1 * | 8/2002 | Mabru | 440/113 |
| 2002/0121780 | A1 * | 9/2002 | Westerbeke, Jr. | 290/1 A |

* cited by examiner

MARINE POWER GENERATION AND ENGINE COOLING

REFERENCE TO OTHER APPLICATIONS

This application is a continuation-in-part of my co-pending PCT application US01/49981, entitled "ELECTRICAL POWER GENERATION"and filed Nov. 7, 2001 designating the United States, and claims priority under 35 U.S.C. §119(e) from U.S. provisional application 60/266,841, filed Feb. 6, 2001, and, through the above-referenced PCT application, from U.S. provisional application 60/246,554, filed Nov. 7, 2000.

TECHNICAL FIELD

This invention relates to marine engine cooling and to electrical power generation, and more particularly to fuel-powered, on-board marine generators.

BACKGROUND

There are many commercially available generators, some of which are designed especially for use on board boats. A typical marine engine-generator set has a seawater-cooled engine with its crankshaft coupled to the rotor of an electrical generator, with the crankshaft and rotor collinear and horizontal as mounted in operation. Injecting the cooling seawater directly into the exhaust stream cools the engine exhaust.

On many smaller craft, electrical power generation is desirable, but space is limited. It can be particularly difficult below deck, for example, to accommodate the height of commercially available power generators. Market economics generally limit marine power generator manufacturers to the use of engines and generator components otherwise available for other, higher volume applications. A new approach to producing electrical power is needed to satisfy the market need for compact, reliable power generation.

New approaches are also desirable for cooling engines and other power-producing marine equipment. Outboard engines are known to be cooled by pumping seawater through the engine and injecting it into the exhaust stream. Because of the corrosive nature of seawater, it is recommended that such engines be regularly flushed with fresh water.

SUMMARY

I have realized that a new configuration of engine and generator components can produce an electrical power generation system suitable to meet the needs of owners of smaller watercraft, and those requiring lower output ratings. I have also realized that marine power generation equipment, such as motors, generators and the like, may be usefully cooled by circulating seawater through a heat exchanger that draws heat from a less corrosive and/or more efficient coolant flowing through the power generation equipment itself.

In one aspect of my invention, an on-board marine electrical power generator contains a conventional four-stroke, water-cooled outboard motor engine coupled to an alternator upon a transportable frame suitable for mounting on-board a boat (e.g., on a horizontal surface below deck).

By "outboard motor engine" I mean an engine designed for use in outboard motors, with a vertically-oriented crankshaft.

In some embodiments, the outboard motor engine is modified to enable its reliable operation with its crankshaft extending horizontally. In some other embodiments, the outboard engine motor shaft extends vertically and is directly coupled to an alternator rotor.

Another aspect of my invention features a fuel-powered engine with a vertically oriented shaft coupled to a vertically oriented rotor of an electrical generator laterally spaced from the engine shaft, such that the engine and generator are disposed in side-by-side relation. This configuration enables the use of commercially available, water-cooled engines and engine components from vertically-shafted, outboard marine motors, for example, while keeping the height of the overall package within a range suitable for installation on pleasure boats.

The engine preferably operates on a four-stroke, gasoline (Otto) cycle, and has an exhaust elbow adapted to mix a flow of water into the streaming exhaust to cool the exhaust before it is discharged. Four-stroke engines are particularly preferred for their ability to operate under elevated exhaust back pressures, such as are required to push water-injected exhaust streams through backwash-inhibiting exhaust risers.

The engine and generator are preferably mounted to a portable frame that may also support power-conditioning circuits for the alternator. The output shaft of the engine may be coupled to the rotor shaft of the generator by belted pulleys, for quiet power transmission at a desired speed ratio.

The alternator or generator may be of several types known in the art, but for some applications a variable speed, permanent magnet alternator is preferred. Such alternators are commonly used in generating electrical power from wind-driven turbines, for example, and can be equipped with power conditioning circuitry to provide a stable output frequency over a wide range of input speeds. An advantage of variable speed operation is that the engine can be configured to change speeds in response to load, to maintain an optimum operating efficiency and to enable the use of advantageously small, less powerful engines.

By "rotor" I mean the rotating portion of the alternator, whether carrying electrical windings as an armature, or carrying magnets.

In some embodiments, the permanent magnet alternator is coupled to the engine to run at a relatively constant, "synchronous" speed (e.g., 1800 RPM), to produce a desired output frequency. Such a configuration is appropriate for applications that will accommodate some variation in output voltage over a range of operational loads and temperatures. One advantage of this configuration is that it employs a much simpler alternator architecture than that of a wound generator stator with exciter circuits, for example, without the added expense of solid state frequency generation circuitry.

According to one aspect of the invention, an on-board marine electrical power generator includes a four-stroke, water-cooled engine with a vertically-oriented drive shaft; an alternator with a vertically oriented rotor coupled for rotation with the engine drive shaft to produce electricity and laterally spaced from the engine shaft; and a transportable frame upon which the engine and alternator are mounted in side-by-side relation.

In some applications, the generator is mounted inside a boat hull, with an exhaust system of the engine including an exhaust riser extending to above a water line of the hull. In some cases, the exhaust system extends through a transom bulkhead exhaust port, for example.

Preferably, the platform defines mounting points for securing the generator to below-deck structure.

In some embodiments, the generator also includes an enclosure surrounding the engine and alternator. In some cases, the enclosure is equipped with output power receptacles. Preferably, the enclosure admits air only for combustion, and otherwise completely encloses the engine and alternator, to significantly reduce air-borne noise from the engine and alternator.

For particular advantage in below-deck applications, for example, the generator preferably has an overall height of less than about 15 inches, more preferably less than about 12 inches. This advantageously low height is enabled with a vertically shafted engine by the side-by-side arrangement of engine and alternator.

Preferably, the generator occupies a footprint (i.e., its overall extent in a horizontal sense) with a length of less than about 25 inches and a width of less than about 15 inches. More preferably, the length is less than about 20 inches and the width is less than about 12 inches.

The engine preferably has an exhaust elbow adapted to mix a flow of water into streaming exhaust to cool the exhaust before it is discharged and, in some applications, the shaft of the engine is coupled to the rotor of the alternator by belted pulleys.

For some applications, the alternator is a variable speed, permanent magnet alternator, and the engine is configured to change speeds in response to load. For some other applications, the alternator is coupled to the engine to run at a synchronous speed.

In some embodiments, the drive shaft also turns a seawater pump, which may be directly coupled to the drive shaft at an opposite end of the engine than a pulley driving the alternator.

The engine may be cooled by a circulated coolant cooled in a liquid-liquid heat exchanger through which seawater is circulated before being injected into an exhaust system of the engine.

In some configurations the alternator is air-cooled, with air in the enclosure cooled by circulation through an air-seawater intercooler, for example.

According to another aspect of the invention, a marine electrical power generator is mounted inside a boat hull, and includes a four-stroke, water-cooled engine with a vertically-oriented drive shaft and an exhaust system including an exhaust riser extending to above a water line of the hull. A permanent magnet alternator with a cup-shaped rotor is mounted at one end of the engine drive shaft to produce electricity, and both the engine and alternator are mounted upon a transportable frame with mounting points for securing the generator inside the boat hull, such as below a deck of the boat.

In some applications, the rotor carries an arrangement of permanent magnets attached to an inner circumferential surface of the rotor. Preferably, the weight and position of the magnets are selected to balance firing impulses and radial accelerations of the engine and its rotating components.

In some cases, the alternator includes a stationary, wound stator responsive to the moving magnetic fields generated by the rotor, and packaged within the rotating rotor.

According to another aspect of the invention, a method of producing electrical power on-board a boat is provided. The method includes the steps of attaching a crankshaft of an outboard motor engine to an electrical generator, mounting the engine and generator on-board a boat, such as below deck, and running the engine to produce electrical power, and directing electrical power from the generator to a remote electrical load, such as an electrical appliance or on-board power grid, to perform useful work.

In some applications, the method also includes enclosing both the engine and generator in an enclosure.

In some cases, the engine and generator are mounted in side-by-side relation. In some other cases, the generator is mounted directly to the crankshaft at one end of the engine.

According to another aspect of my invention, an improved method of cooling marine power generation equipment is provided. Seawater is drawn from the body of water on which the boat floats, through a liquid-to-liquid heat exchanger, and then injected into a stream of exhaust before returning to the body of water. A liquid coolant is pumped along a closed path through the housing of the power generation equipment, where it absorbs heat generated by moving components within the housing, through the heat exchanger where it transfers the absorbed heat to the seawater, and then circulated back through the housing. This aspect of the invention can obtain particular advantage in combination with one or more of the aspects outlined above.

In some cases, the cooled power generation equipment comprises an outboard motor disposed rearward of a transom of the boat. In other cases, the cooled power generation equipment is mounted within the hull of the boat and employed either for propulsion or electrical power generation. In a particularly preferred example, the cooled power generation equipment comprises a vertically shafted combustion engine driving an electrical power generator mounted within the hull of a boat.

The circulated liquid coolant can be, for example, fresh water, ethylene glycol, or other liquid coolant known to be suitable for recirculating engine cooling.

Aspects of this invention can provide cost-effective electrical power generators of a physical size and power rating particularly needed by some boat owners, particularly those with moderate to low power requirements and who prefer a system that can be permanently mounted below deck and out of sight, rather than mounted outboard, for example, where they would be exposed to direct salt spray and less secure from theft. Furthermore, aspects of this invention can provide effective cooling of marine power equipment without requiring periodic flushing that is particularly undesirable for inboard equipment.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
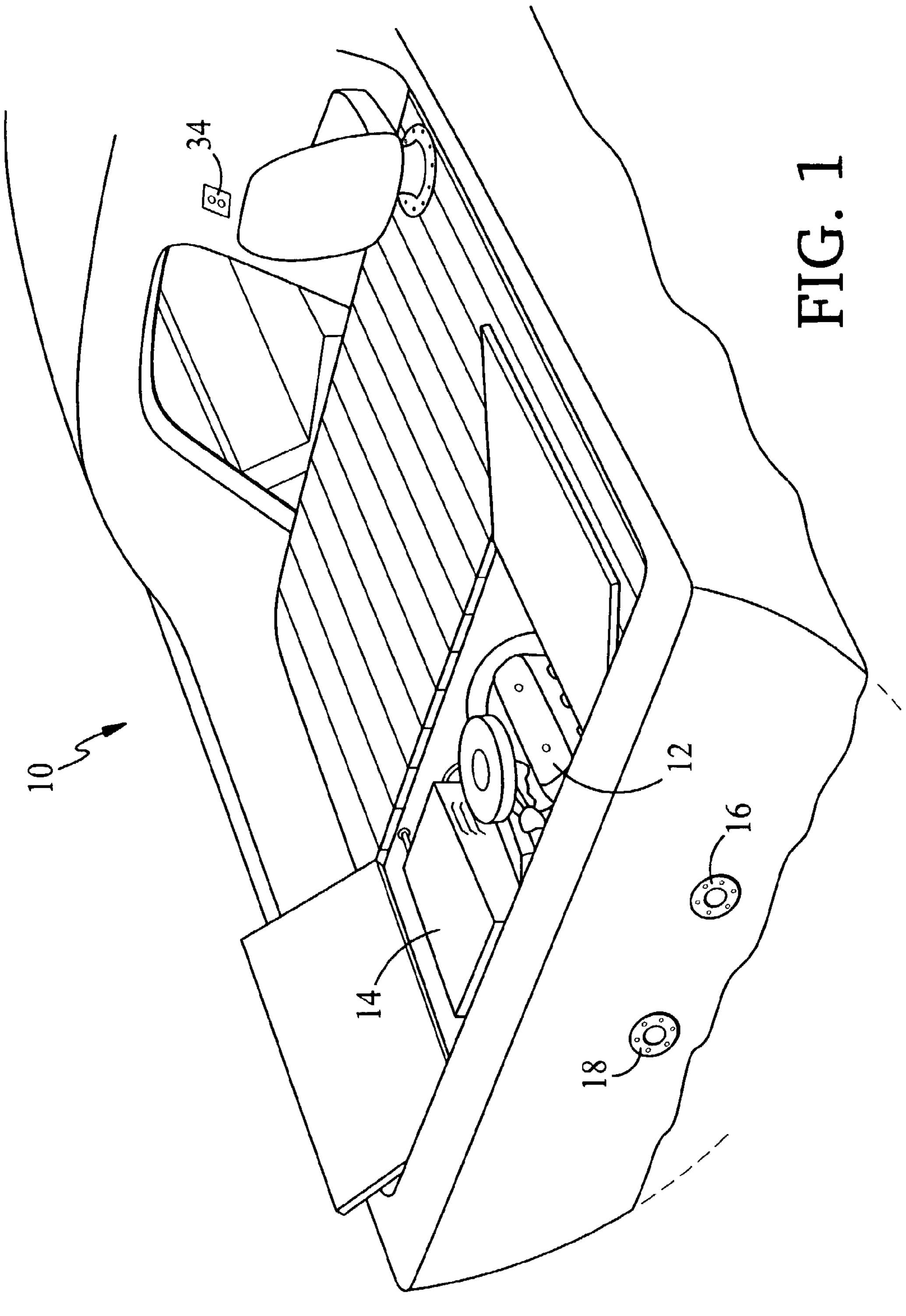
FIGS. 1 and 2 illustrate an electrical power generator installed on board a boat.

Referring first to FIG. 1, a boat 10 is equipped with an inboard, gasoline-powered engine 12 and an electric generator 14, with both the engine and generator mounted below deck and accessible through a hatch as shown. Engine 12 and generator 14 may be fed from the same fuel tank (not shown), and exhaust through respective transom bulkhead exhaust ports 16 and 18.

Figure 2:
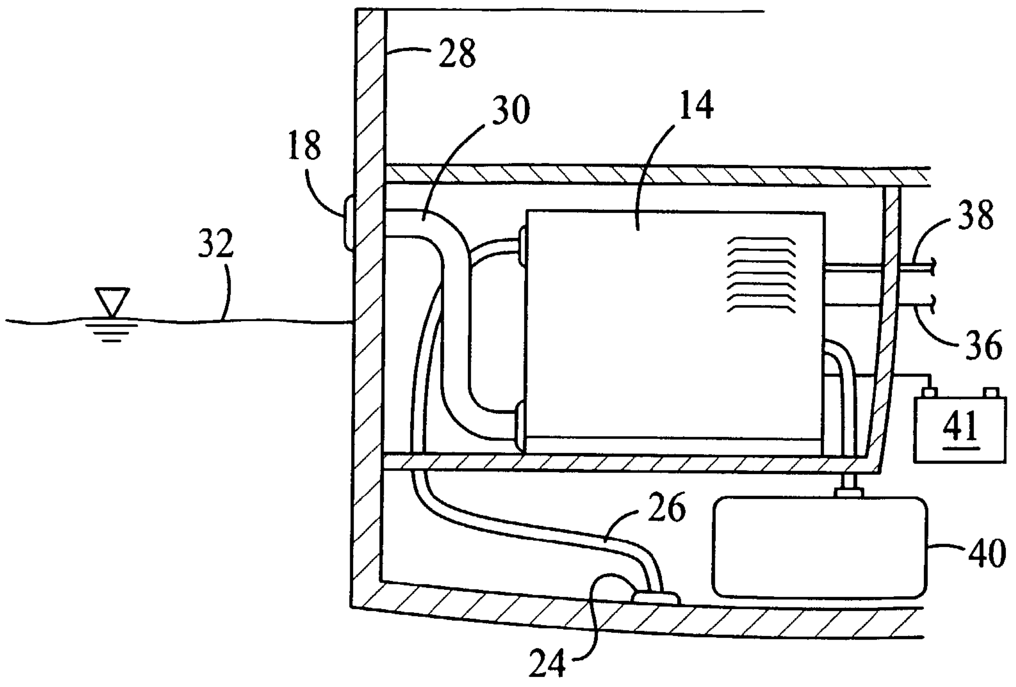

As shown in FIG. 2, the generator 14 is mounted upon a platform 20 secured to the boat hull below the rear deck 22. Platform 20 has appropriate mounting points (such as bolting bosses, tie-down features, or vibration-isolating mounting pads; not illustrated) for securing the generator to below-deck structure. Cooling water is suctioned from a seacock 24 through an inlet hose 26, for injection into the exhaust stream of the generator engine as discussed in more detail below. Cooled exhaust gasses are routed through the transom 28 through an exhaust pipe 30 that rises to above the water line 32. Generator 14 is controlled from a remote controller (e.g., switch panel 34 in FIG. 1), receiving input signals through electrical signal line 36. Generated electrical power is routed to onboard electrical loads (e.g., appliances, air conditioners and such, not shown) via output cable 38. The generator is powered by liquid fuel (e.g., gasoline or diesel fuel) from tank 40, and a typical marine battery 41 provides 12VDC power.

Figure 3:
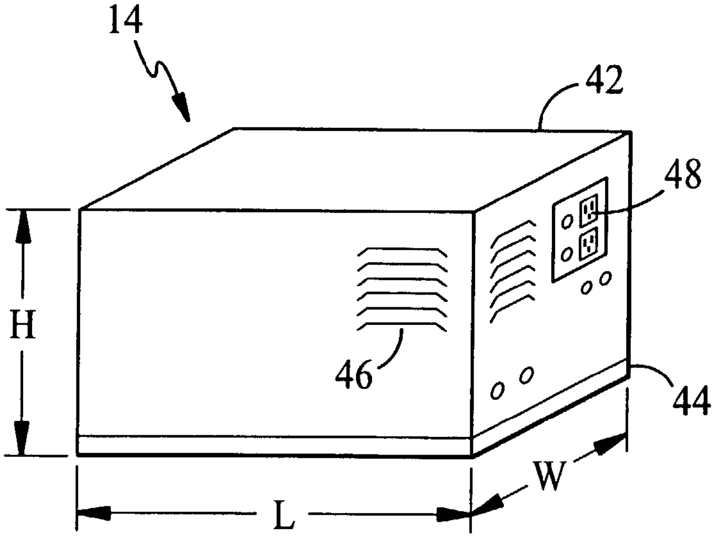
FIG. 3 is a perspective view of the electrical power generator.

Referring now to FIG. 3, generator 14 forms a compact, readily mountable, practically stand-alone unit. The generator may be equipped with a sound-deadening enclosure 42, as shown, or may alternately be mounted on a rigid frame 44 with open sides and top for increased air circulation. Details of a suitable enclosure 42 can be found in U.S. Pat. No. 5,929,394, the contents of which are incorporated by reference as if entirely set forth. Preferably the height "H" of the entire unit is less than about 15 inches or 38 centimeters (more preferably, less than about 12 inches or 30 centimeters), and occupies a footprint with a length "L" of less than about 25 inches or 63 centimeters (more preferably, less than about 20 inches or 50 centimeters), and a width "W" of less than about 15 inches or 38 centimeters (more preferably, less than about 12 inches or 30 centimeters). The weight of a 3 to 4 kilowatt unit is only about 120 pounds. Louvers 46 may be provided through enclosure 42 for increased air circulation, and the enclosure may optionally be equipped with output power receptacles 48, as shown.

Figure 4:
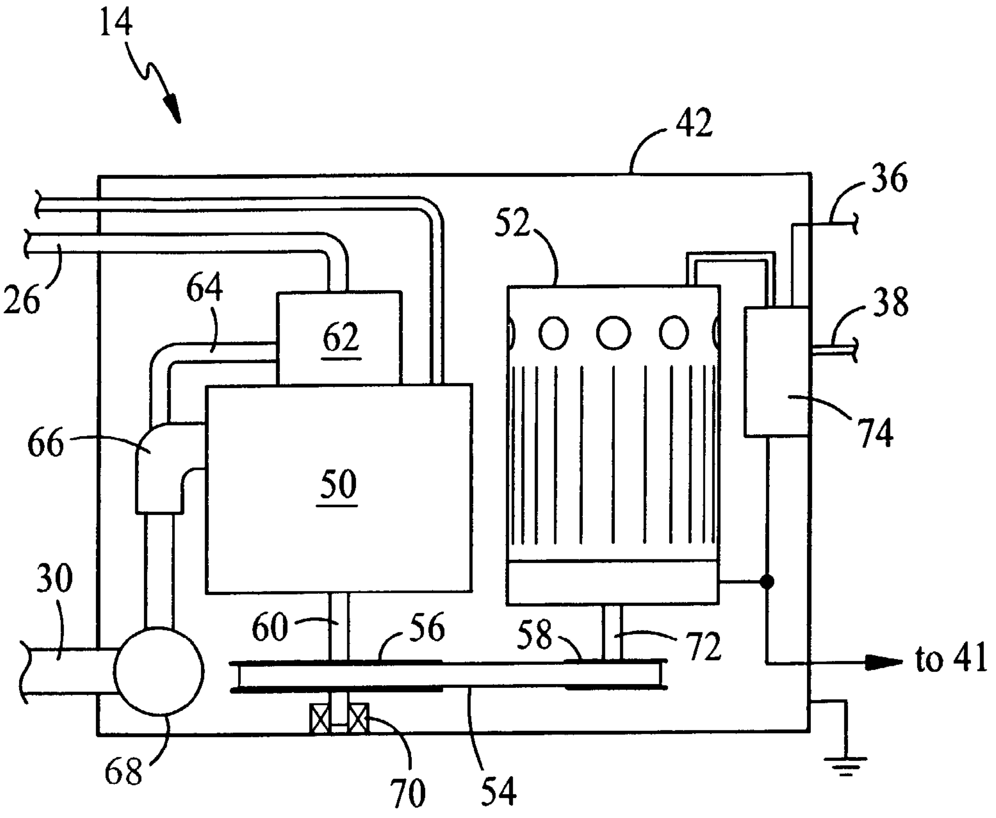
FIG. 4 is a schematic cross-sectional view of the generator, showing the side-by-side arrangement of vertically oriented engine and alternator.

Turning to FIG. 4, generator 14 contains a engine 50 coupled to an electric alternator 52 through a flexible timing or synchronous belt 54 and respective pulleys 56 and 58. Belt 54 is of the type commonly used to drive camshafts in automotive engines, for example. Pulley 56 is mounted for rotation with one end of the vertical crankshaft 60 of engine 50, with the other end of crankshaft 60 turning a positive displacement pump 62 for suctioning seawater from inlet hose 26 and pumping the seawater out through hose 64 into engine exhaust elbow 66 where it is injected into the exhaust stream of the engine to cool the exhaust before it enters muffler 68.

In a presently preferred and commercially advantageous embodiment, engine 50 is a four-stroke gasoline engine designed for use in a vertical shaft configuration in outboard marine motors, and is therefore appropriate for marine environmental conditions. Such engines are typically already equipped with exhaust cooling elbow 66 and seawater pump 62, and are therefore readily adapted for use in generator 14 by mounting the engine block to the generator frame, and supporting the lower end of crankshaft 60 in a frame-mounted bearing block 70. For a generator 14 rated at about 3 to 4 kilowatts, a two cylinder, 15 horsepower outboard engine motor is suitable. For a generator 14 rated at only about 1–2 kilowatts, a one cylinder, 6 horsepower outboard engine motor is sufficient. As emissions regulations continue to encourage the replacement of two-stroke outboard motor engines with four-stroke versions, the cost and availability of appropriate engines suitable for use in my generator should continue to improve.

The overall height of the generator is kept advantageously low by arranging alternator 52 to occupy the same vertical space as engine 50, with their shafts running parallel, spaced apart and vertical. The rotor shaft 72 of alternator 52 is mounted upon two spaced apart bearings (not shown) within the alternator housing, such that pulley 58 is mounted in cantilevered fashion at the end of the rotor shaft. In this example, alternator 52 is a permanent magnet alternator designed to be run at variable speed. Variable speed PM alternators are also known to be employed in wind machines and in some modern automotive systems, such as in hybrid vehicles.

Engine 50 may include a speed regulator to maintain the speed of the engine as close as possible to a speed selected with respect to the drive ratio to cause a synchronous alternator speed for producing a desired output frequency. For example, the engine may be speed-regulated about a 1500 RPM set point to cause a four-pole alternator to rotate at 1800 RPM for producing a 60 hertz output frequency. Such embodiments may require an increase in engine capacity over variable speed arrangements in order to maintain the speed and voltage within acceptable ranges over operational loads and temperatures, but advantageously do not require elaborate power conditioning circuitry.

Alternatively, generator controller 74 may include appropriate power-conditioning circuitry as is employed in variable speed, permanent magnet motor drivers, for accepting a wide range of raw power frequencies from alternator 52 and producing a desired output frequency. The cost of such circuitry will in some cases be sufficiently offset by the corresponding use of a smaller (lighter, less expensive) engine configured to operate at higher speeds in response to high load.

Other preferred features and aspects of controller 74 are disclosed in presently pending U.S. Ser. No. 09/368,200, filed Aug. 4, 1999 and incorporated herein by reference as if entirely set forth.

Figure 5:
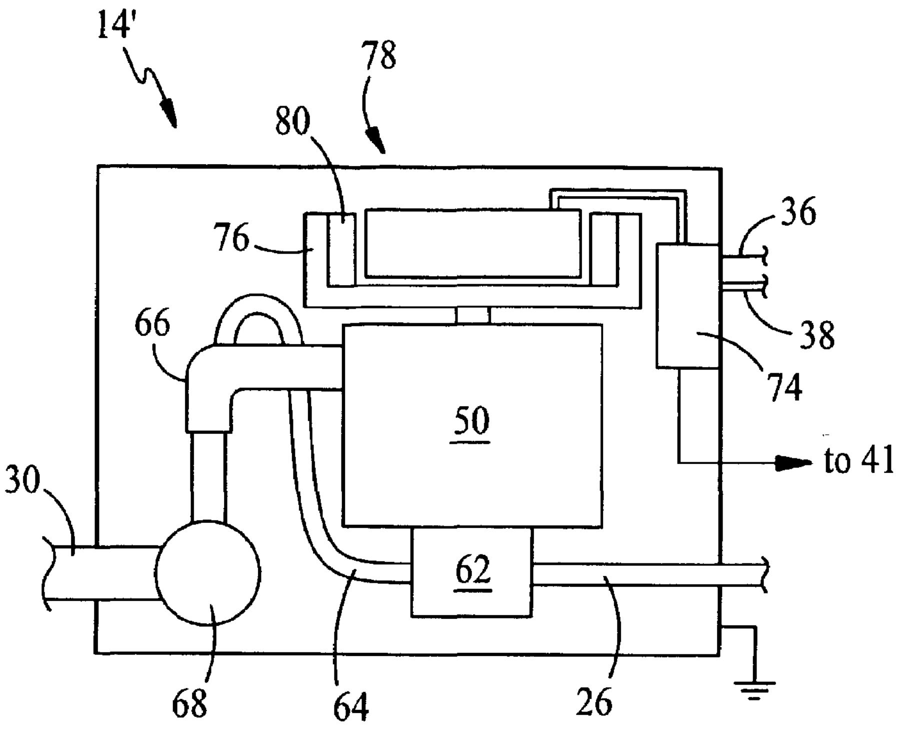
FIG. 5 is a schematic cross-sectional view of a second embodiment of the generator, showing an in-line, vertical coupling of engine and alternator.

Referring to the embodiment of FIG. 5, generator 14' contains a vertically-shafted, four-stroke outboard engine motor 50 in which the standard flywheel at the end of its crankshaft has been replaced with a cup-shaped rotor 76 of a pancake profile, permanent magnet alternator 78. Rotor 76 turns with the motor crankshaft and carries an arrangement of permanent magnets 80 attached to its inner circumferential surface. The weight and position of magnets 80 are selected to balance firing impulses and radial accelerations of the motor and its rotating components. Packaged within rotating rotor 76 is a stationary, wound stator 82 responsive to the moving magnetic fields generated by rotor 76. This type of alternator can be constructed to have a very low profile or axial length, such that, replacing the flywheel of the motor, the motor-alternator combination can add only few inches to the height of the motor itself. Pump 62 may be mounted on the other end of the crankshaft, as shown, or can be electrically powered and mounted remotely for even lower package height.

Figure 6:
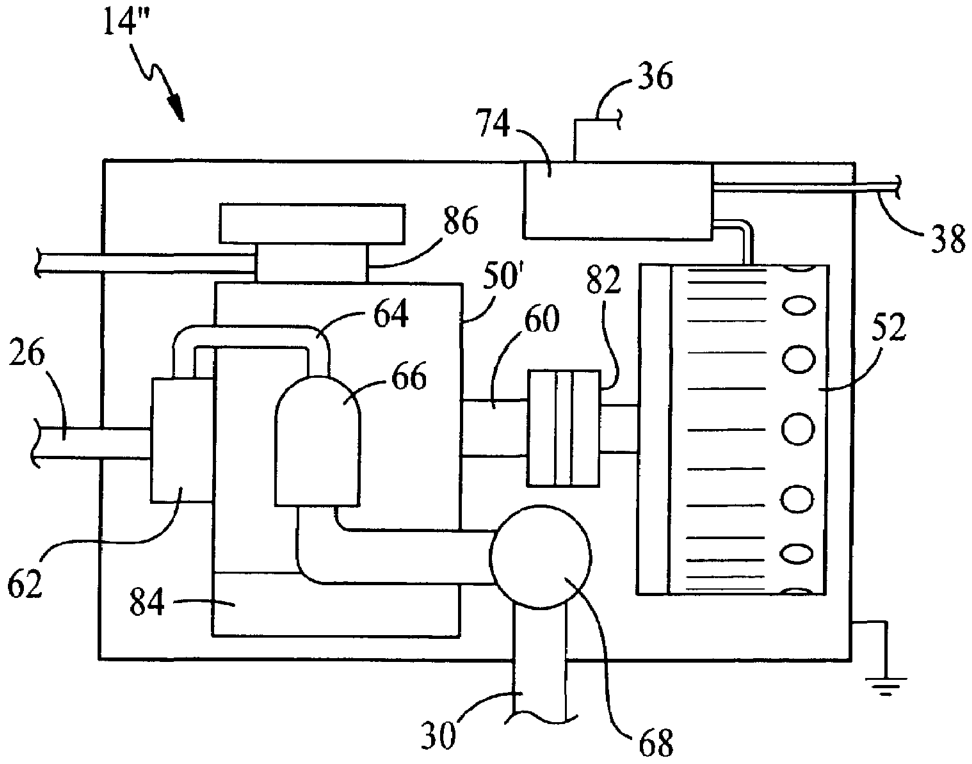
FIG. 6 is a schematic cross-sectional view of a third embodiment of the generator, showing an in-line, horizontal coupling of engine and alternator.

The two above-described embodiments share the practical advantage of enabling the use of virtually unmodified outboard motor engines, which are produced in high quantity and therefore very reasonably priced. However, it is also possible to modify such engines for use in horizontally coupled configurations, as shown in FIG. 6. In generator 14", engine 50' is mounted with its crankshaft 60 extending horizontally and coupled through a flexible coupling 82 to the rotor shaft of alternator 52. Because engine 50' was designed to operate with shaft 60 vertical, a few key modifications are made to ensure proper operation and reliability. First, engine 50' is equipped with a bottom oil sump 84 with an appropriate internal oil pickup for siphoning lubricating oil up into the engine. For some outboard motor engines, other modifications may be required to keep oil from pooling on shaft seals, or collecting in internal passages and not returning properly to the sump. Second, carburetor 86 has been repositioned to maintain a vertical throat orientation as designed. In some cases, this entails installing a custom intake manifold designed for this purpose. Other necessary modifications will also be recognized and understood by those of ordinary skill, depending on the specific outboard motor engine selected for any given application.

Figure 7:
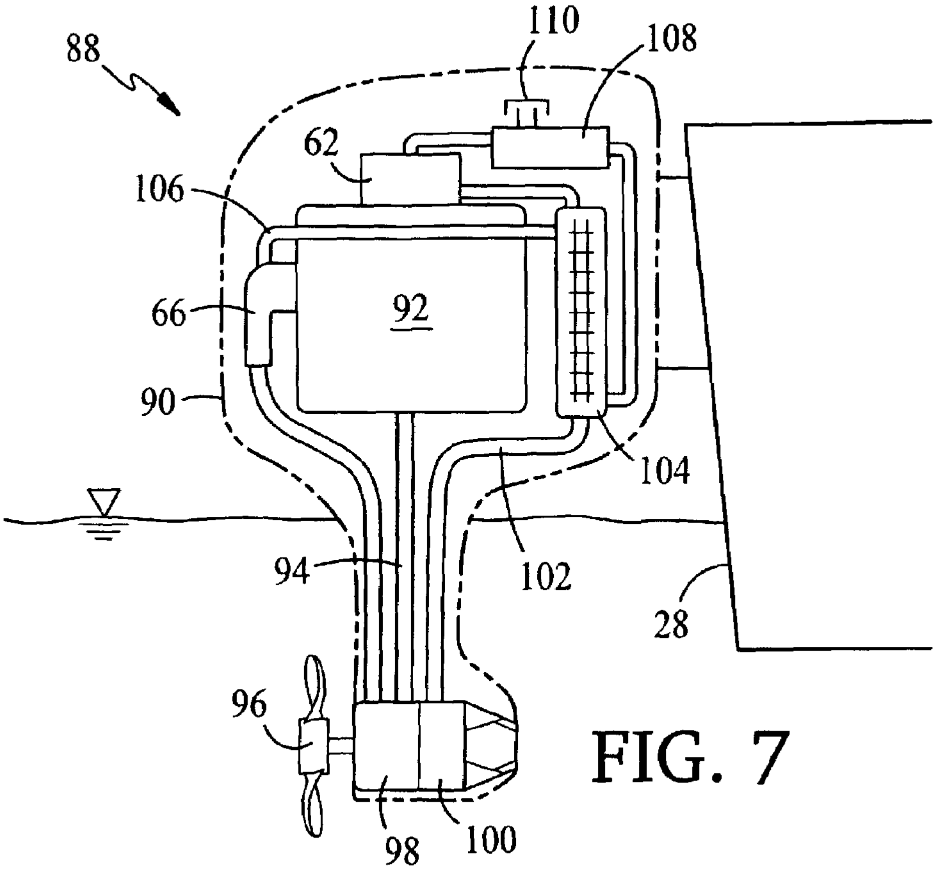
FIG. 7 shows an outboard marine motor cooled with recirculating coolant.

Referring now to FIG. 7, an outboard motor 88 has an exterior shell 90 shown in dashed outline. Within the shell a gasoline motor 92 turns a vertical drive shaft 94 that rotates a propeller 96 through a lower gearbox 98. Gearbox 98 also turns a seawater pump 100 that pumps seawater up through conduit 102 into a high temperature side of a liquid-to-liquid heat exchanger 104 where it absorbs heat. From there, the warmed seawater is forced along conduit 106 into injection elbow 66. The exhaust and injected seawater flow down along exhaust pipe 112, and are ejected into the water below the water line. Meanwhile, liquid engine coolant (e.g., fresh water or ethylene glycol) is recirculated through motor 92 and heat exchanger 104, where heat is extracted from the coolant. The coolant is motivated by pump 62, which draws the coolant from a small reservoir 108 equipped with a fill cap 110. Within heat exchanger 104, the flows of seawater and coolant are maintained in their separation, such that they never mix. Because seawater never enters the housing of motor 92, periodic flushing is not required and corrosion is reduced.

Figure 8:
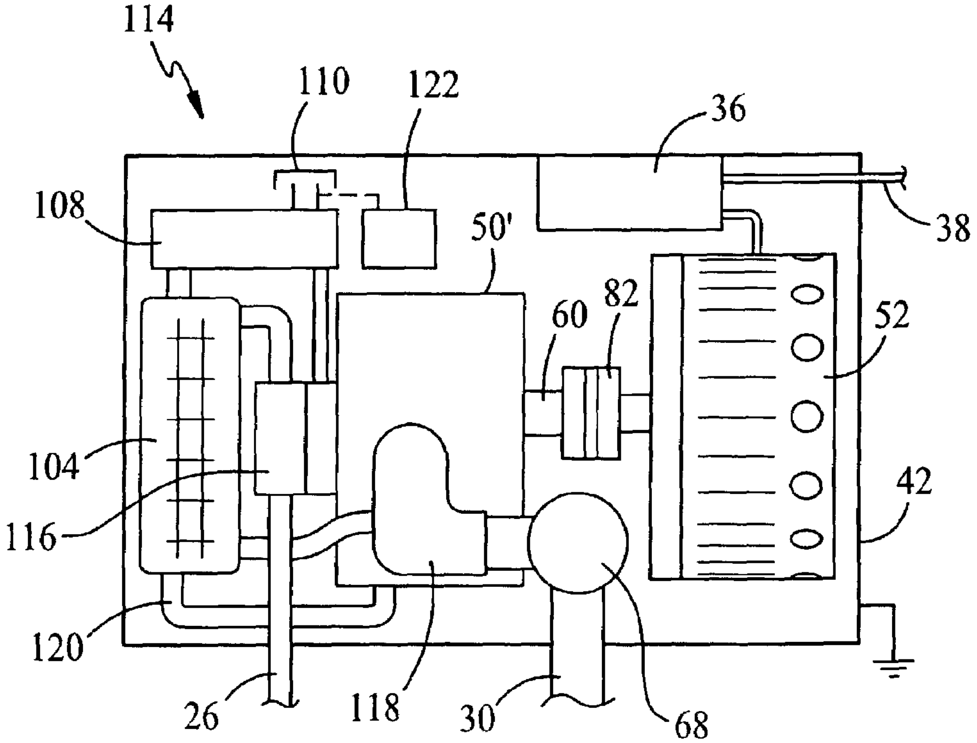
FIG. 8 shows an inboard marine engine-generator set cooled with seawater passed through a heat exchanger.

In FIG. 8, the motor 50' of generator 114 is equipped with a double pump 116 mounted to one end of its horizontal drive shaft. The outer half of pump 116 pumps seawater from inlet 26 through the hot side of heat exchanger 104, and then into injection elbow 118, where it is injected into the exhaust stream. The inner half of pump 116 pumps coolant from reservoir 108 through the housing of motor 50', out along conduit 120 into the cold side of heat exchanger 104, and then back into reservoir 108, which is equipped with a pressure relief valve and an overflow tank 122. A pressure expansion tank (not shown) may also be employed. As in the outboard motor cooling system of FIG. 7, the two liquid flows are kept separate, and seawater never enters the housing of motor 50'. Thus, the motor housing can be advantageously cast of materials susceptible to corrosion from prolonged contact with salt water. Furthermore, generator 114 may be mounted in enclosed spaces below deck as no air flow is required for cooling.

Alternator 52 may be air-cooled, with either a separate air-seawater intercooler (not shown) included in enclosure 42, or with the enclosure air circulated through heat exchanger 104 by a fan (not shown). Alternatively, alternator 52 may be liquid-cooled, either by passing the engine coolant through stator cooling tubes in the alternator, or with a separate coolant circuit that passes either through a dedicated cell of heat exchanger 104 or through a separate coolant-seawater intercooler (not shown). In any of these cases, all of the cooling seawater is preferably discharged into the exhaust at elbow 118. The above-described alternator cooling arrangements may also be employed in cooling engine-generator sets configured with vertical drive shafts, such as shown in FIG. 4. Details regarding a useful air-seawater intercooler can be found in my U.S. Pat. No. 5,014,660 and 5,125,378, the contents of both of which are incorporated by reference herein, as if set forth in their entirety.

A number of embodiments of the invention have been described. Nevertheless, it will be understood that various modifications may be made without departing from the spirit and scope of the invention. For example, the pulleys and belt of the embodiment of FIG. 4 can be arranged above the engine and alternator, with the seawater pump mounted below. Accordingly, other embodiments are within the scope of the following claims.

What is claimed is:

1. A marine electrical power generator mounted inside the hull of a boat, the generator comprising a four-stroke, water-cooled engine with a vertically-oriented drive shaft and an exhaust system including an exhaust riser extending to above a water line of the hull;

a permanent magnet alternator with a cup-shaped rotor mounted at one end of the engine drive shaft to produce electricity; and a transportable frame upon which the engine and alternator are mounted, the platform defining mounting points securing the generator inside the boat hull;

wherein the rotor carries an arrangement of permanent magnets attached to an inner circumferential surface of the rotor;

wherein the generator is mounted below a deck of the boat.

2. The generator of claim 1 further comprising an enclosure surrounding the engine and alternator.

3. The generator of claim 1 wherein the alternator includes a stationary, wound stator responsive to the moving magnetic fields generated by the rotor and packaged within the rotating rotor.

4. The generator of claim 1 wherein the engine comprises an engine designed for use in a vertical shaft configuration in outboard marine motors.

5. The generator of claim 1 having an overall height of less than about 12 inches.

6. A marine electrical power generator mounted inside the hull of a boat, the generator comprising a four-stroke, water-cooled engine with a vertically-oriented drive shaft and an exhaust system including an exhaust riser extending to above a water line of the hull;

a permanent magnet alternator with a cup-shaped rotor mounted at one end of the engine drive shaft to produce electricity; and a transportable frame upon which the engine and alternator are mounted, the platform defining mounting points securing the generator inside the boat hull;

wherein the rotor carries an arrangement of permanent magnets attached to an inner circumferential surface of the rotor wherein weight and position of the magnets are selected to balance firing impulses and radial accelerations of the engine and its rotating components.

7. A marine electrical power generator mounted inside the hull of a boat, the generator comprising a four-stroke, water-cooled engine with a vertically-oriented drive shaft and an exhaust system including an exhaust riser extending to above a water line of the hull;

a permanent magnet alternator with a cup-shaped rotor mounted at one end of the engine drive shaft to produce electricity; and a transportable frame upon which the engine and alternator are mounted, the platform defining mounting points securing the generator inside the boat hull;

wherein the rotor carries an arrangement of permanent magnets attached to an inner circumferential surface of the rotor a seawater pump mounted on another end of the engine drive shaft.

8. A marine electrical power generator mounted inside the hull of a boat, the generator comprising a four-stroke, water-cooled engine with a vertically-oriented drive shaft and an exhaust system including an exhaust riser extending to above a water line of the hull;

a permanent magnet alternator with a cup-shaped rotor mounted at one end of the engine drive shaft to produce electricity; and a transportable frame upon which the engine and alternator are mounted, the platform defining mounting points securing the generator inside the boat hull;

wherein the rotor carries an arrangement of permanent magnets attached to an inner circumferential surface of the rotor;

wherein the generator has an overall height of less than about 15 inches.

9. A method of producing electrical power on-board a boat, the method comprising attaching a crankshaft of an outboard motor engine to an electrical generator with a permanent magnet alternator having a cup-shaped rotor mounted at one end of the engine drive shaft carrying an arrangement of permanent magnets attached to an inner circumference of the alternator;

mounting the engine and generator below the deck of a boat;

running the engine to produce electrical power; and directing electrical power from the generator to a remote electrical load.

10. An on-board marine electric power generator comprising:

a four-stroke, water-cooled engine with a vertically-oriented drive shaft and an exhaust system including an exhaust riser extending to above a water line of the hull of a boat;

an alternator with a vertically oriented rotor coupled for rotation with the engine drive shaft to produce electricity and laterally spaced from the engine shaft; and a transportable frame upon which the engine and alternator are mounted in side-by-side relation;

wherein the generator is mounted below a deck of the boat.

11. The generator of claim 10 wherein the exhaust rise extends to an exhaust outlet disposed on the hull.

12. The generator of claim 10 further comprising an enclosure surrounding the engine and alternator.

13. The generator of claim 10 wherein the alternator includes a stationary, wound stator responsive to the moving magnetic fields generated by the rotor and packaged within the rotating rotor.

14. The generator of claim 10 wherein the engine comprises an engine designed for use in a vertical shaft configuration in outboard marine motors.

15. The generator of claim 10 having an overall height of less than about 12 inches.

16. An on-board marine electric power generator comprising:

a four-stroke, water-cooled engine with a vertically-oriented drive shaft and an exhaust system including an exhaust riser extending to above a water line of the hull;

an alternator with a vertically oriented rotor coupled for rotation with the engine drive shaft to produce electricity and laterally spaced from the engine shaft; and a transportable frame upon which the engine and alternator are mounted in side-by-side relation;

wherein weight and position of the magnets are selected to balance firing impulses and radial accelerations of the engine and its rotating components.

17. An on-board marine electric power generator comprising:

a four-stroke, water-cooled engine with a vertically-oriented drive shaft and an exhaust system including an exhaust riser extending to above a water line of the hull;

an alternator with a vertically oriented rotor coupled for rotation with the engine drive shaft to produce electricity and laterally spaced from the engine shaft;

a transportable frame upon which the engine and alternator are mounted in side-by-side relation; and a seawater pump mounted on another end of the engine drive shaft.

18. An on-board marine electric power generator comprising:

a four-stroke, water-cooled engine with a vertically-oriented drive shaft and an exhaust system including an exhaust riser extending to above a water line of the hull;

an alternator with a vertically oriented rotor coupled for rotation with the engine drive shaft to produce electricity and laterally spaced from the engine shaft; and a transportable frame upon which the engine and alternator are mounted in side-by-side relation;

wherein the generator has an overall height of less than about 15 inches.

* * * * *